United States Patent
Chen et al.

(10) Patent No.: US 10,819,583 B2
(45) Date of Patent: Oct. 27, 2020

(54) NETWORK DEVICE MANAGEMENT METHOD AND APPARATUS

(71) Applicant: Huawei Technologies Co., Ltd., Shenzhen (CN)

(72) Inventors: Hongfei Chen, Shenzhen (CN); Xing Tong, Beijing (CN); Jun Gong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/119,673

(22) Filed: Aug. 31, 2018

(65) Prior Publication Data
US 2018/0375740 A1  Dec. 27, 2018

Related U.S. Application Data

(63) Continuation of application No. PCT/CN2016/075301, filed on Mar. 2, 2016.

(51) Int. Cl.
*H04L 12/24* (2006.01)
*H04L 12/26* (2006.01)
(Continued)

(52) U.S. Cl.
CPC .......... *H04L 41/142* (2013.01); *H04L 43/065* (2013.01); *H04L 43/0876* (2013.01);
(Continued)

(58) Field of Classification Search
CPC . H04L 41/142; H04L 43/065; H04L 43/0876; H04L 43/0894; H04L 47/80; H04L 49/90
(Continued)

(56) References Cited

U.S. PATENT DOCUMENTS

2012/0063308 A1* 3/2012 Sohn ................... H04L 43/0894
  370/232
2012/0236705 A1* 9/2012 Hayashi .............. H04L 43/0829
  370/216

(Continued)

FOREIGN PATENT DOCUMENTS

CN  102263649 A  11/2011
CN  102263669 A  11/2011
(Continued)

OTHER PUBLICATIONS

"NetFlow exchange and its application in network management," PC World China, No. 13, China Academic Journal Electronic Publishing House, (Jul. 10, 2002).
(Continued)

*Primary Examiner* — Robert J Lopata
(74) *Attorney, Agent, or Firm* — Leydig, Voit & Mayer, Ltd.

(57) ABSTRACT

A network device management method and apparatus are provided. The method includes: generating statistical traffic data, where the statistical traffic data includes at least one of data traffic of a port of a network device, a queue status of the network device, traffic of a data packet that passes through the network device, or traffic of a target data flow that passes through the network device; and sending the statistical traffic data to a controller. The controller receives statistical traffic data sent by multiple network devices, and can adjust a path of a data flow dynamically according to a traffic status of each port of the multiple network devices or a traffic status of a transmitted data flow in the multiple network devices and by changing routing tables of the network devices, thereby improving link utilization, and further improving network performance.

9 Claims, 3 Drawing Sheets

(51) Int. Cl.
*H04L 12/927* (2013.01)
*H04L 12/861* (2013.01)

(52) U.S. Cl.
CPC ......... *H04L 43/0894* (2013.01); *H04L 47/80* (2013.01); *H04L 49/90* (2013.01)

(58) Field of Classification Search
USPC ....................................................... 370/252
See application file for complete search history.

(56) References Cited

U.S. PATENT DOCUMENTS

| | | | |
|---|---|---|---|
| 2013/0117842 A1 | 5/2013 | Kakadia et al. | |
| 2014/0140216 A1* | 5/2014 | Liu ................. | H04L 45/125 370/238 |
| 2015/0222560 A1 | 8/2015 | Kakadia et al. | |
| 2015/0295752 A1* | 10/2015 | Yamashita ......... | H04L 41/0654 370/225 |
| 2015/0319090 A1* | 11/2015 | Fu .................... | H04L 41/06 370/235 |
| 2015/0365537 A1* | 12/2015 | Kahn ................ | H04M 15/65 455/408 |
| 2016/0142340 A1* | 5/2016 | Zhou ................ | H04L 12/6418 370/401 |
| 2016/0164787 A1* | 6/2016 | Roach .............. | H04L 43/065 370/235 |
| 2017/0149640 A1* | 5/2017 | Narayanan ........ | H04L 47/2483 |
| 2018/0013787 A1* | 1/2018 | Jiang ................ | H04L 43/16 |
| 2018/0183683 A1* | 6/2018 | Geng ................ | H04L 41/0816 |

FOREIGN PATENT DOCUMENTS

| | | |
|---|---|---|
| CN | 103414594 A | 11/2013 |
| EP | 2929472 B1 | 9/2017 |

OTHER PUBLICATIONS

"OpenFlow Switch Specification Version 1.5.0 ( Protocol version 0x06 )," Open Networking Foundation, (Dec. 19, 2014).

Farrel et al, "A Path Computation Element (PCE)-Based Architecture," Network Working Group, Request for Comments:4655, Category: Standards Track, The Internet Society (Aug. 2006).

Vasseur et al., "Path Computation Element (PCE) Communication Protocol (PCEP)," Network Working Group, Request for Comments: 5440, Category: Standards Track, IETF Trust, (Mar. 2009).

Awduche et al, "RSVP-TE: Extensions to RSVP for LSP Tunnels," Network Working Group, Request for Comments:3209, Category: Standards Track, The Internet Society, (Dec. 2001).

* cited by examiner

|          | Port 1-Out | Port 2-Out | Port 3-Out |
|----------|------------|------------|------------|
| Port 1-In | — | 1500 in, 1500 out<br>0 packet lost | 2500 in, 2400 out<br>100 packets lost |
| Port 2-In |  | — |  |
| Port 3-In | 3500 in, 3300 out<br>200 packets lost |  | — |

NETWORK DEVICE MANAGEMENT METHOD AND APPARATUS

CROSS-REFERENCE TO RELATED APPLICATIONS

This application is a continuation of International Application No. PCT/CN2016/075301, filed on Mar. 2, 2016, the disclosure of which is hereby incorporated by reference in its entirety.

TECHNICAL FIELD

Embodiments of the present application relate to the communications field, and in particular, to a network device management method and apparatus.

BACKGROUND

Currently, a user, for example, a network administrator or a device operation and maintenance person, can check current usage of a device (for example, a router) in a network only by using a command line or a management information base (MIB) provided by an equipment vendor. However, in practice, the user cannot check usage of the entire network. For example, the user cannot check a position of congestion in the network or traffic and a flow direction of data in the network. As a result, the user cannot learn usage of each device in the network accurately.

SUMMARY

This application provides a network device management method and apparatus, so as to learn usage of a device in a network.

According to a first aspect, a network device management method is provided, where the method includes: generating statistical traffic data, where the statistical traffic data includes one or more of a quantity of data of a port of a network device, a queue status of the network device, a quantity of data packets that pass through the network device, and a quantity of target data flows that pass through the network device, where the queue status includes a queue occupancy rate, and the target data flow is a data flow to be measured; and sending the statistical traffic data to a controller.

The network device collects statistics of the quantity of data of each port and the quantity of transmitted data flows, and sends the statistical traffic data that includes a statistical result to the controller, so that the controller can obtain the statistical traffic data.

With reference to the first aspect, in a first implementation of the first aspect, the network device may be a router or a switch.

With reference to the first aspect and the first implementation of the first aspect, in a second implementation of the first aspect, the network device may be set to send the statistical traffic data to the controller periodically. For example, a sending period may be set to 1 minute, so that the network device sends the statistical traffic data to the controller every minute.

With reference to the first aspect, and the first and the second implementations of the first aspect, in a third implementation of the first aspect, the quantity of data of a port includes one or more of a quantity of input packets, a quantity of input correct packets, a quantity of input incorrect packets, a quantity of output packets, a quantity of output unicast packets or a quantity of output multicast packets of the port within a preset time.

With reference to the first aspect, and the first to the third implementations of the first aspect, in a fourth implementation of the first aspect, the preset time may be set according to an actual situation. For example, the preset time may be the same as a period during which the network device sends the statistical traffic data, that is, the network device collects statistics of the quantity of data of a port that exists within each period.

With reference to the first aspect, and the first to the fourth implementations of the first aspect, in a fifth implementation of the first aspect, the queue status further includes a quantity of lost packets corresponding to the queue. A phenomenon of a packet loss may occur when the queue occupancy rate of the network device reaches 100%. Therefore, the queue status may include collecting statistics of the quantity of lost packets.

With reference to the first aspect, and the first to the fifth implementations of the first aspect, in a sixth implementation of the first aspect, the queue status may be an instantaneous status of the queue at a current moment.

With reference to the first aspect, and the first to the sixth implementations of the first aspect, in a seventh implementation, the network device may determine a status of the queue by using a traffic manager (TM).

With reference to the first aspect, and the first to the seventh implementations of the first aspect, in an eighth implementation of the first aspect, the method further includes: receiving an instruction message sent by the controller, where the instruction message is used to instruct the network device to return the statistical traffic data; and the generating statistical traffic data includes: generating the statistical traffic data according to the instruction message.

With reference to the first aspect, and the first to the eighth implementations of the first aspect, in a ninth implementation of the first aspect, the instruction message includes statistical period information, and the sending the statistical traffic data to a controller includes: sending the statistical traffic data to the controller periodically according to the statistical period information.

With reference to the first aspect, and the first to the ninth implementations of the first aspect, in a tenth implementation of the first aspect, the instruction message includes an identifier of the target data flow, the statistical traffic data includes the quantity of the target data flows, and the generating the statistical traffic data according to the instruction message includes: determining the target data flow and collecting statistics of the quantity of the target data flows according to the identifier of the target data flows, so as to generate the statistical traffic data.

With reference to the first aspect, and the first to the tenth implementations of the first aspect, in an eleventh implementation of the first aspect, for an Internet Protocol (IP) packet, the identifier of the target data flow is a (source IP address, destination IP address) pair; and the generating the statistical traffic data according to the instruction message includes: determining the target data flow and collecting statistics of the quantity of the target data flows according to the (source IP address, destination IP address) pair, so as to generate the statistical traffic data that includes the quantity of the target data flows. The network device may measure, according to the identifier sent by the controller, the quantity of data flows that are designated by the controller.

With reference to the first aspect, and the first to the eleventh implementations of the first aspect, in a twelfth implementation of the first aspect, the identifier includes a match item of a unicast routing table, the statistical traffic data includes the quantity of target data flows, and the target data flows are data flows in a path corresponding to the unicast routing table; and the generating the statistical traffic data according to the instruction message includes: according to the match item of the unicast routing table, determining the data flows in the path corresponding to the unicast routing table and collecting statistics of the quantity of the data flows in the path corresponding to the unicast routing table, so as to generate the statistical traffic data.

With reference to the first aspect, and the first to the twelfth implementations of the first aspect, in a thirteenth implementation of the first aspect, the identifier includes a match item of a multicast routing table, the statistical traffic data includes the quantity of a target data flows, and the target data flows are data flows in a path corresponding to the multicast routing table; and the generating the statistical traffic data according to the instruction message includes: according to the match item of the multicast routing table, determining the data flows in the path corresponding to the multicast routing table, and collecting statistics of the quantity of the data flows on the path corresponding to the multicast routing table, so as to generate the statistical traffic data.

According to a second aspect, a network device management method is provided, where the method includes: receiving statistical traffic data sent by each of one or more network devices, where the statistical traffic data includes one or more of a quantity of data of a port of each network device, a queue status of each network device, a quantity of data packets that pass through each network device, and a quantity of target data flows that pass through each network device, where the queue status includes a queue occupancy rate, and the target data flows are data flows to be measured; and managing the one or more network devices according to the statistical traffic data received from the one or more network devices.

The controller receives the statistical traffic data sent by the one or more network devices, and can manage the one or more network devices according to a traffic status of each port included in the statistical traffic data or a traffic status of a transmitted data flow included in the statistical traffic data, thereby improving network performance.

With reference to the second aspect, in a first implementation of the second aspect, the network device may be a router or a switch.

With reference to the second aspect and the first implementation of the second aspect, in a second implementation of the first aspect, the network device may be set to send the statistical traffic data periodically. For example, a sending period may be set to 1 minute, so that the network device sends the statistical traffic data to the controller every minute. The controller receives the statistical traffic data sent by at least one network device every minute, and can determine a data flow transmission status in a network according to the statistical traffic data, and make adjustment.

With reference to the second aspect, and the first and the second implementations of the first aspect, in a third implementation of the second aspect, the quantity of data of a port includes one or more of a quantity of input packets, a quantity of input correct packets, a quantity of input incorrect packets, a quantity of output packets, a quantity of output unicast packets or a quantity of output multicast packets of each port within a preset time.

With reference to the second aspect, and the first to the third implementations of the second aspect, in a fourth implementation of the second aspect, the preset time during which each network device collects statistics of the quantity of data of a port may be set according to an actual situation. For example, the preset time may be the same as a period during which the network device sends the statistical traffic data, that is, the network device collects statistics of the quantity of data of a port that exists within each period.

With reference to the second aspect, and the first to the fourth implementations of the second aspect, in a fifth implementation of the second aspect, the queue status includes a quantity of lost packets corresponding to the queue in each network device. A phenomenon of a packet loss may occur when the queue occupancy rate of the network device reaches 100%. Therefore, the queue status may include collecting statistics of the quantity of lost packets. The controller may determine, according to the queue status, a queue in which congestion occurs. The queue status may be an instantaneous status of the queue at a current moment.

With reference to the second aspect, and the first to the fifth implementations of the second aspect, in a sixth implementation of the second aspect, the method further includes: sending an instruction message to each network device, where the instruction message is used to instruct each network device to return the statistical traffic data. Each network device may actively send the statistical traffic data to the controller periodically, or the controller may send an instruction message to instruct each network device to return the statistical traffic data.

With reference to the second aspect, and the first to the sixth implementations of the second aspect, in a seventh implementation of the second aspect, the instruction message includes statistical period information; and the receiving statistical traffic data sent by each of one or more network devices includes: receiving the statistical traffic data that is periodically sent by each network device according to the statistical period information.

With reference to the second aspect, and the first to the seventh implementations of the second aspect, in an eighth implementation of the second aspect, the instruction message includes an identifier of the target data flow, and the statistical traffic data includes the quantity of the target data flows. The controller sends an instruction message to the network device, where the instruction message may include an identifier of a data flow, so that the network device determines a target data flow and collects statistics of the quantity of the target data flows according to the identifier the target data flows, so as to generate statistical traffic data, where the statistical traffic data includes a statistical traffic result of the target data flow.

With reference to the second aspect, and the first to the eighth implementations of the second aspect, in a ninth implementation of the second aspect, for an IP packet, the identifier of the target data flow included in the instruction message is a (source IP address, destination IP address) pair. The network device determines the target data flow and collects statistics of the quantity of the target data flows according to the (source IP address, destination IP address) pair, so as to generate the statistical traffic data that includes the quantity of the target data flows. The controller receives the statistical traffic data sent by the network device.

With reference to the second aspect, and the first to the ninth implementations of the second aspect, in a tenth implementation of the second aspect, the identifier included in the instruction message may be a match item of a unicast routing table, the statistical traffic data includes the quantity of target data flows, and the target data flows are data flows in a path corresponding to the unicast routing table. Because a same unicast routing table may be hit by multiple unicast data packets in a network device, the quantity of data in the path corresponding to the unicast routing table may be excessively large. Therefore, the controller may send an instruction message to the network device, where the instruction message may include an identifier, and the identifier is a match item of a unicast routing table, so that the network device determines a data flow in a path corresponding to the unicast routing table and collects statistics of quantity of the data flows in the path corresponding to the unicast routing table according to the match item of the unicast routing table included in the instruction message, so as to generate statistical traffic data that includes the target data flow, enabling the controller to determine, according to the statistical traffic data, whether the quantity of data in the path corresponding to the unicast routing table is excessively large, or whether a congestion occurs, and adjust a transmission path of a unicast data flow in a timely manner by modifying the routing table.

With reference to the second aspect, and the first to the tenth implementations of the second aspect, in an eleventh implementation of the second aspect, the identifier included in the instruction message may be a match item of a multicast routing table, the statistical traffic data includes the quantity of target data flows, and the target data flows are data flows in a path corresponding to the multicast routing table. Because a same multicast routing table may be hit by multiple multicast data packets in a network device, the quantity of data tin the path corresponding to the multicast routing table may be excessively large. Therefore, the controller may send an instruction message to the network device, where the instruction message may include an identifier, and the identifier is a match item of a multicast routing table, so that the network device determines a data flow in a path corresponding to the multicast routing table and collects statistics of the quantity of the data flows in the path corresponding to the multicast routing table according to the match item of the multicast routing table included in the instruction message, so as to generate statistical traffic data that includes the target data flow, enabling the controller to determine, according to the statistical traffic data, whether the quantity of data in the path corresponding to the multicast routing table is excessively large, or whether a congestion occurs, and adjust a transmission path of a multicast data flow in a timely manner by modifying the multicast routing table.

With reference to the second aspect, and the first to the eleventh implementations of the second aspect, in a twelfth implementation of the second aspect, the managing the one or more network devices according to the statistical traffic data received from the one or more network devices includes: adjusting a transmission path of a unicast data flow or a transmission path of a multicast data flow according to the statistical traffic data from the one or more network devices and by modifying a routing table. The controller may determine, according to statistical traffic data sent by different network devices, whether congestion occurs in each network device. For a network device in which traffic congestion occurs, path optimization and traffic adjustment can be performed by adjusting a routing table, thereby improving link utilization, and further improving network performance.

According to a third aspect, a network device is provided, configured to perform the method of the first aspect. The network device includes units configured to perform the method of the first aspect or any possible implementation of the first aspect.

According to a fourth aspect, a network device management controller is provided, configured to perform the method of the second aspect. The controller includes units configured to perform the method of the second aspect or any possible implementation of the second aspect.

According to a fifth aspect, a network device is provided, including: a port and a processor, where the processor is configured to: generate statistical traffic data, where the statistical traffic data includes one or more of a quantity of data of the port of the network device, a queue status of the network device, a quantity of data packets that pass through the network device, or quantity of target data flows that pass through the network device, where the queue status includes a queue occupancy rate, and the target data flows are data flows to be measured; and send the statistical traffic data to a controller through the port. The processor may further be configured to perform the step in any possible implementation of the first aspect.

According to a sixth aspect, a network device management controller is provided, including: a transceiver, a memory, and a processor, where the processor is configured to: receive, by using the transceiver, statistical traffic data sent by each of one or more network devices, where the statistical traffic data includes one or more of a quantity of data of a port of each network device, a queue status of each network device, a quantity of data packets that pass through each network device, and a quantity of target data flows that pass through each network device, where the queue status includes a queue occupancy rate, and the target data flows are data flows to be measured; and manage the one or more network devices according to the statistical traffic data that is received from the one or more network devices by the transceiver and that is stored in the memory. The processor is further configured to perform the step in any possible implementation of the second aspect.

According to a seventh aspect, a computer-readable medium is provided, configured to store a computer program, where the computer program includes an instruction used to perform the method of the first aspect or any possible implementation of the first aspect.

According to an eighth aspect, a computer-readable medium is provided, configured to store a computer program, where the computer program includes an instruction used to perform the method of the second aspect or any possible implementation of the second aspect.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Figure 1:
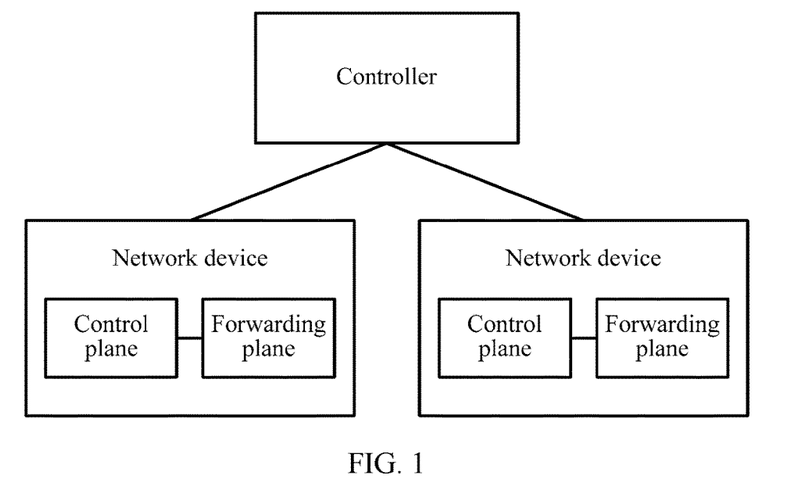
FIG. 1 is a schematic diagram of a network system according to an embodiment of the present application.

FIG. 1 is a schematic diagram of a network system according to an embodiment of the present application. The network system includes a controller and at least one network device. In FIG. 1, a description is provided by using an example in which two network devices are included. The controller can manage and control the network device. The network device may be a router or a switch.

In this embodiment of the present application, the network device may include a control plane and a forwarding plane. The control plane may be used to control and manage running of a network protocol. The network device may exchange information with the controller by using the control plane. The forwarding plane may be used to transmit a data flow.

Optionally, the forwarding plane may include a traffic manager (TM). The TM is used to perform congestion management on data packets. For example, when multiple data packets need to be transmitted through a same port, and total traffic of these data packets exceeds a physical bandwidth of the port, the TM may select, according to priorities of the data packets, data packets to be sent.

Figure 2:
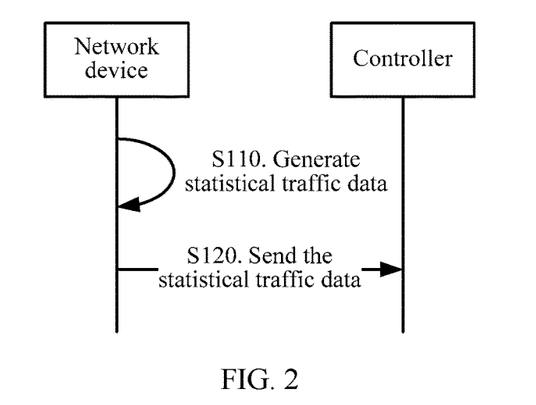
FIG. 2 is a schematic flowchart of a network device management method according to an embodiment of the present application.

FIG. 2 is a schematic flowchart of a network device management method 100 according to an embodiment of the present application. As shown in FIG. 2, the method 100 includes:

S110: A network device generates statistical traffic data, where the statistical traffic data includes one or more of a quantity of data of a port of the network device, a queue status of the network device, a quantity of data packets that pass through the network device, and a quantity of target data flows that pass through the network device, where the queue status includes a queue occupancy rate, and the target data flows are data flows to be measured.

A controller in the method 100 in FIG. 2 may be the controller in the network system shown in FIG. 1, and the network device in the method 100 in FIG. 2 may be either of the network devices in the network system shown in FIG. 1. For example, the network device may be a router or a switch.

Optionally, the network device may generate the statistical traffic data actively, or may generate the statistical traffic data passively. Generating the statistical traffic data actively indicates that the network device sends the statistical traffic data to the controller actively without depending on an instruction of the controller. For example, the network device may send the statistical traffic data periodically. That is, the network device generates the statistical traffic data periodically (for example, may generate the statistical traffic data every minute), and sends the generated statistical traffic data to the controller periodically. The network device may also generate the statistical traffic data passively, that is, the controller sends an instruction message to the network device, and the network device sends the statistical traffic data to the controller in response to the instruction message.

If the network device sends the statistical traffic data to the controller actively, the statistical traffic data may include one or more of the following: a quantity of data of a port of the network device, a queue status of the network device, or a quantity of data packets that pass through the network device. However, the quantity of data flows are generally not included in the statistical traffic data sent actively by the network device to the controller. Because there are many data flows passing through the network device, efficiency of collecting statistics of the quantity of all data flows is low. Therefore, statistics of data flows are generally collected passively, that is, the controller sends an instruction message to the network device, to instruct the network device to determine a quantity of target data flows to be measured, and the network device sends, according to the instruction message, the quantity of the target data flows, instead of the quantity of all the data flows.

The quantity of data of a port of the network device may include one or more of a quantity of input packets, a quantity of input correct packets, a quantity of input incorrect packets, a quantity of output packets, a quantity of output unicast packets, or a quantity of output multicast packets. After receiving a packet through the port, the network device may perform verification processing on the packet according to a parity bit, to determine whether the packet is correct, so as to collect statistics of a quantity of correct packets received by the port and a quantity of incorrect packets received by the port. For example, the network device may perform verification processing on a packet by using a port chip.

The network device may collect statistics of the quantity of data of the port that exists within a preset time period. For example, the network device generates statistical traffic data every five minutes. The statistical traffic data may include the quantity of data of the port of the network device, and the quantity of data of the port may include a statistical result of a quantity of data input through the port and a quantity of data output through the port. Optionally, the quantity of data of the port may be instantaneous traffic measured by the network device, or average traffic within a preset time.

The queue status of the network device may include a queue occupancy rate of the network device and/or a quantity of lost packets. Because a phenomenon of a packet loss may occur when the queue occupancy rate reaches 100%, the quantity of lost packets is a parameter of the queue status. When the queue status includes the quantity of lost packets, the queue occupancy rate may be regarded as 100% by default. The network device may measure and generate a queue status at a current moment. Optionally, the queue status of the network device may be measured by the TM. Optionally, the queue status of the network device may be a current status of the queue when statistical traffic data is generated.

Figure 3:
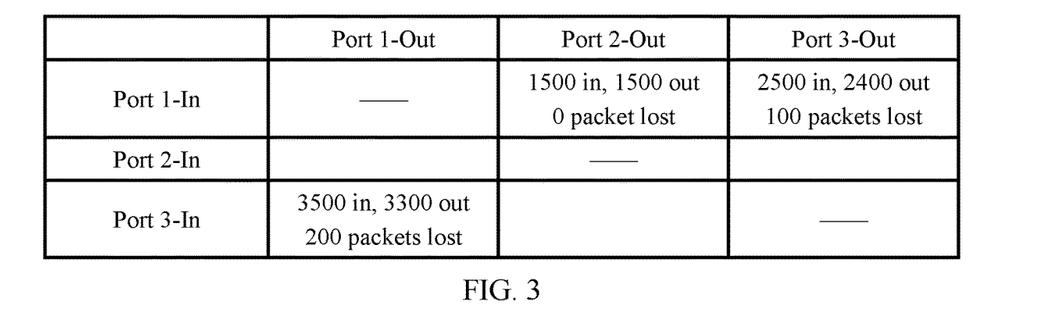
FIG. 3 is a statistical table of a unicast data packet traffic matrix in a network device according to an embodiment of the present application.

The quantity of the data packets that pass through the network device may include a quantity of unicast data packets and/or a quantity of multicast data packets. A traffic matrix of the unicast data packets may be used to collect statistics of the quantity of the unicast data packets. The traffic matrix of the unicast data packets is statistics of packet traffic from an ingress to an egress. As shown in FIG. 3, assuming that the network device has three ports (port), namely, Port 1, Port 2 and Port 3. Within one measurement period, the traffic matrix of the unicast data packets may be shown in FIG. 3. It can be seen from FIG. 3 that from Port 1 to Port 2, the quantity of unicast data packets is 1500, and no packet loss occurs. From Port 1 to Port 3, the quantity of incoming unicast data packets is 2500, the quantity of outgoing unicast data packets is 2400, and 100 packets are lost. From Port 3 to Port 1, the quantity of incoming unicast data packets is 3500, the quantity of outgoing unicast data packets is 3300, and 200 packets are lost. The statistical result is a statistical traffic result of unicast data packets that pass through the network device. The statistical traffic data generated by the network device may include the statistical traffic result.

Optionally, the measuring a quantity of data packets that pass through the network device may further include: measuring a quantity of multicast data packets, where the quantity of multicast data packets is represented by a traffic matrix of the multicast data packets. However, as a transmission manner of multicast data packets is relatively complex, a corresponding traffic matrix of the multicast data packets is also complex, and is not described by using examples herein.

The network device may also generate statistical traffic data passively. The controller may send an instruction message to the network device, and the network device measures traffic according to the instruction message, to generate the statistical traffic data. The controller may send the instruction message to one or more network devices, where the instruction message instructs the network device to return the statistical traffic data.

Optionally, the instruction message may include a return period, so that the network device returns statistical traffic data to the controller periodically according to the instruction message.

The statistical traffic data returned by the network device according to the instruction message may include a quantity of data of a port of the network device, that is, the quantity of data of one or more ports of the network device that is returned to the controller by the network device according to the instruction message. The quantity of data of the port may be similar to the statistical traffic data sent actively by the network device, and may include one or more of a quantity of input packets, a quantity of input correct packets, a quantity of input incorrect packets, a quantity of output packets, a quantity of output unicast packets, or a quantity of output multicast packets of the port within a preset time.

Similarly, the statistical traffic data returned by the network device according to the instruction message may further include the queue status of the network device. The queue status may be similar to the statistical traffic data sent actively by the network device, and includes a queue occupancy rate and/or a quantity of lost packets.

Similarly, the statistical traffic data returned by the network device according to the instruction message may further include a quantity of data packets that pass through the network device. The quantity of the data packets may be similar to the quantity of the data packets sent actively by the network device, that is, the quantity of the data packets may include a quantity of unicast data packets or a quantity of multicast data packets, and may be measured in the form of a traffic matrix.

Optionally, the statistical traffic data returned by the network device according to the instruction message may further include a quantity of target data flows. The target data flows may be any data flow to be measured. The measuring a quantity of target data flows includes: measuring a quantity of packets and/or a quantity of bytes of the target data flow. The network device may determine the target data flow by using an identifier. The instruction message sent by the controller to the network device includes the identifier of the target data flow. The network device determines the target data flow and the quantity of the target data flows according to the identifier.

For example, for an Internet Protocol (IP) packet, a (source IP address, destination IP address) pair may be used to identify a target data flow.

For another example, the identifier of the target data flow may further be a match item of a unicast routing table. The network device determines, according to the identifier, a target data flow corresponding to an entry of the routing table, and returns a quantity of the target data flows in a path corresponding to the unicast routing table. Because a same entry of the unicast routing table may be hit by multiple unicast data packets, the controller may instruct, by using the identifier in the instruction message, the network device to return the quantity of data flows in any path corresponding to the unicast routing table, so that the controller can determine whether the path corresponding to the unicast routing table is congested because of excessively large quantity of data flows.

For another example, the identifier of the target data flow may further be a match item of a multicast routing table. The network device may determine, according to the identifier, a target data flow corresponding to an entry of the multicast routing table, and returns a quantity of the target data flows in a path corresponding to the multicast routing table. Because a same entry of the multicast routing table may be hit by multiple multicast data packets, the controller may instruct, by using the identifier in the instruction message, the network device to return the quantity of data in any path corresponding to the multicast routing table, so that the controller can determine whether the path corresponding to the multicast routing table is congested because of excessively large quantity of data flows.

S120. The network device sends the statistical traffic data to a controller. The controller manages the network device according to the statistical traffic data sent by the network device. The controller may receive statistical traffic data sent by one or more network devices, and manages the one or more network devices according to the statistical traffic data sent by the one or more network devices.

The controller may send, according to the statistical traffic data sent by the one or more network devices, control information to the one or more network devices. The control information may be used to adjust configuration of a routing table of the network device. For example, the controller may optimize a path of network traffic. The controller may adjust, according to a quantity of data of a port of each network device, the quantity of data of the port of the network device. The controller modifies the routing table of the network device to adjust the path of the quantity of data, so as to make link utilization of the network device optimal.

Sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

The controller receives statistical traffic data sent by multiple network devices, and may determine, according to the statistical traffic data sent by the multiple network devices, a traffic status of each port of the network device, or a traffic status of a data flow passing through the network device, and further dynamically adjust a path of a data flow by changing a routing table of the network device, thereby improving link utilization, and further improving network performance.

With reference to FIG. 1 to FIG. 3, a network device management method provided in the embodiments of the present application is described in detail in the foregoing. A network device management apparatus provided in the embodiments of the present application is described below with reference to FIG. 4 to FIG. 7.

Figure 4:
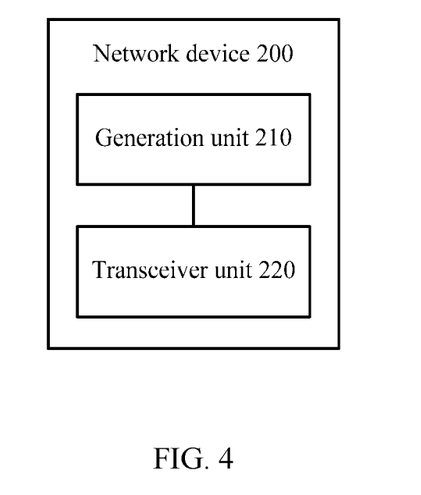
FIG. 4 is a schematic block diagram of a network device according to an embodiment of the present application.

As shown in FIG. 4, a network device 200 provided in an embodiment of the present application includes:

a generation unit 210, configured to generate statistical traffic data, where the statistical traffic data includes one or more of a quantity of data of a port of the network device, a queue status of the network device, a quantity of a data packets that pass through the network device, and a quantity of target data flows that pass through the network device, where the queue status includes a queue occupancy rate, and the target data flows are data flows to be measured; and a transceiver unit 220, configured to send the statistical traffic data to a controller.

The network device 200 according to this embodiment of the present application may correspond to the network device that performs the method 100 in the foregoing embodiment of the present application, and the foregoing and other operations and/or functions of the modules of the network device 200 are used for implementing procedures corresponding to the network device in the method in FIG. 2. For brevity, details are not described herein again.

Therefore, the network device in this embodiment of the present application collects statistics of a quantity of data of each port and a quantity of transmitted data flows, and sends statistical traffic data that includes a statistical result to a controller, so that the controller can adjust a path of a data flow dynamically according to statistical traffic data sent by multiple network devices and by changing routing tables of the network devices, thereby improving link utilization, and further improving network performance.

Figure 5:
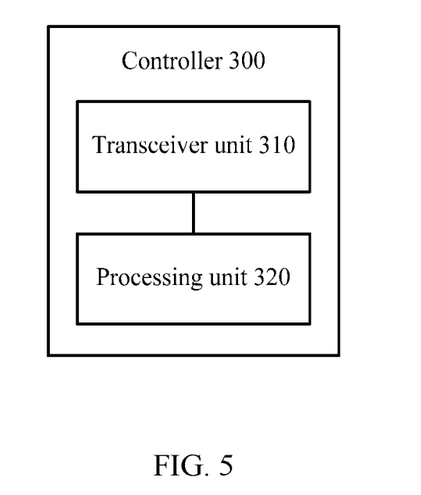
FIG. 5 is a schematic block diagram of a network device management controller according to an embodiment of the present application.

As shown in FIG. 5, a network device management controller 300 provided in an embodiment of the present application includes:

a transceiver unit 310, configured to receive statistical traffic data sent by each of one or more network devices, where the statistical traffic data includes one or more of a quantity of data of a port of each network device, a queue status of each network device, a quantity of data packets that pass through each network device, and a quantity of target data flows that pass through each network device, where the queue status includes a queue occupancy rate, and the target data flow is a data flow to be measured; and a processing unit 320, configured to manage the one or more network devices according to the statistical traffic data received from the one or more network devices.

The controller 300 according to this embodiment of the present application may correspond to the controller that performs the method 100 provided in the foregoing embodiment of the present application, and the foregoing and other operations and/or functions of the modules of the controller 300 are used for implementing procedures corresponding to the controller in the method in FIG. 2. For brevity, details are not described herein again.

Therefore, the network device management controller in this embodiment of the present application receives statistical traffic data sent by multiple network devices, and performs global processing according to a traffic status of each port or a traffic status of a transmitted data flow included in the statistical traffic data. The controller can adjust a path of a data flow dynamically by changing a routing table of a network device, thereby improving link utilization, and further improving network performance.

Figure 6:
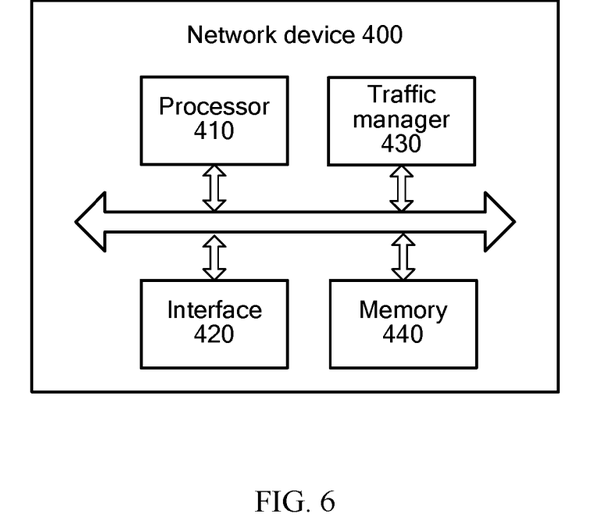
FIG. 6 is a schematic block diagram of a network device according to another embodiment of the present application.

As shown in FIG. 6, an embodiment of the present application further provides a network device 400. The network device 400 may include a processor 410, a port 420 and a traffic manager 430, where the processor 410, the port 420, and the traffic manager 430 are connected. Optionally, the network device 400 may further include a memory 440, where the memory 440 is connected to the processor 410. Optionally, the network device 400 may further include a bus, where the processor 410, the port 420, the traffic manager 430, and the memory 440 may be connected by using the bus. The memory 440 is configured to store an instruction. The processor 410 is configured to execute the instruction stored in the memory 440, so as to control the port 420 to send information or a signal.

The processor 410 is configured to: generate statistical traffic data, where the statistical traffic data may be stored in the memory 440, the statistical traffic data includes one or more of a quantity of data of the port 420 of the network device 400, a queue status of the network device 400, a quantity of data packets that pass through the network device 400, and a quantity of target data flows that pass through the network device 400, where the queue status includes a queue occupancy rate measured by the traffic manager 430, and the target data flows are data flows to be measured; and send the statistical traffic data to a controller through the port 420.

Therefore, the network device in this embodiment of the present application collects statistics of a quantity of each port and a quantity of transmitted data flows, and sends statistical traffic data that includes a statistical result to a controller, so that the controller can adjust a path of a data flow dynamically according to the statistical traffic data sent by the network device and by changing a routing table of the network device, thereby improving link utilization, and further improving network performance.

Optionally, the processor 410 is further configured to: receive, through the port 420, an instruction message sent by the controller, where the instruction message is used to instruct the network device to return the statistical traffic data; and generate the statistical traffic data according to the instruction message.

Optionally, the instruction message includes statistical period information. The processor 410 is configured to send, according to the statistical period information, the statistical traffic data to the controller periodically through the port 420.

Optionally, the instruction message includes an identifier of the target data flow, and the statistical traffic data includes the quantity of the target data flows. The processor 410 is configured to: determine the target data flow and collect statistics of the quantity of the target data flows according to the identifier the target data flow, so as to generate the statistical traffic data.

The network device 400 according to this embodiment of the present application may correspond to the network device 200 in the foregoing embodiment of the present application, and may correspond to a network device that performs the method 100 in the foregoing embodiment of the present application. In addition, the foregoing and other operations and/or functions of the modules of the network device 400 are used for implementing procedures corresponding to the network device in the method in FIG. 2. For brevity, details are not described herein again.

Therefore, the network device in this embodiment of the present application collects statistics of a quantity of each port and a quantity of transmitted data flows, and sends statistical traffic data that includes a statistical result to a controller, so that the controller can adjust a path of a data flow dynamically according to statistical traffic data sent by multiple network devices and by changing routing tables of the network devices, thereby improving link utilization, and further improving network performance.

Figure 7:
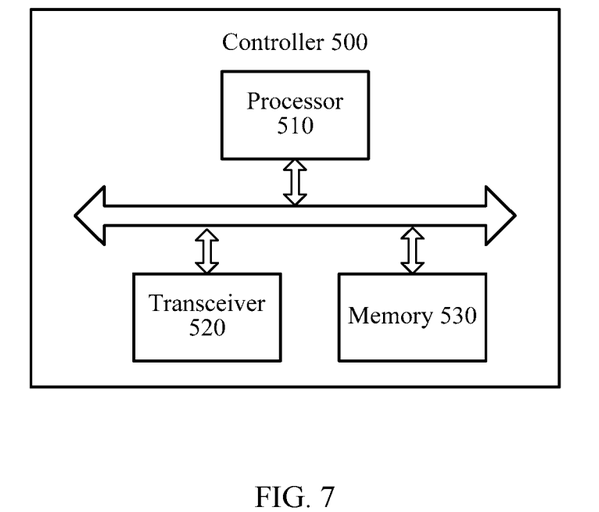
FIG. 7 is a schematic block diagram of a network device management controller according to another embodiment of the present application.

As shown in FIG. 7, an embodiment of the present application further provides a controller 500. The controller 500 includes a processor 510 and a transceiver 520, where the processor 510 is connected to the transceiver 520. Optionally, the controller 500 may further include a memory 530, where the memory 530 is connected to the processor 510. Optionally, the controller 500 may further include a bus, where the processor 510, the transceiver 520 and the memory 530 may be connected by using the bus. The memory 530 is configured to store an instruction. The processor 510 is configured to execute the instruction stored in the memory 530, so as to control the transceiver 520 to receive and transmit a signal.

The transceiver 520 is configured to receive statistical traffic data sent by each of one or more network devices. The memory 530 is configured to store the statistical traffic data sent by each network device. The statistical traffic data includes one or more of a quantity of data of a port of each network device, a queue status of each network device, a quantity of data packets that pass through each network device, and a quantity of target data flows that pass through each network device, where the queue status includes a queue occupancy rate, and the target data flows are data flows to be measured. The processor 510 is configured to manage the one or more network devices according to the statistical traffic data that is sent by the one or more network devices and that is stored in the memory 530.

Therefore, the network device management controller in this embodiment of the present application receives statistical traffic data sent by multiple network devices, and can adjust a path of a data flow dynamically according to a traffic status of each port or a traffic status of a transmitted data flow included in the statistical traffic data and by changing routing tables of the network devices, thereby improving link utilization, and further improving network performance.

Optionally, the transceiver 520 is further configured to send an instruction message to each network device, where the instruction message is used to instruct each network device to return the statistical traffic data.

Optionally, the instruction message includes statistical period information. The transceiver 520 is configured to receive the statistical traffic data that is periodically sent by each network device according to the statistical period information.

Optionally, the instruction message includes an identifier of the target data flow, and the statistical traffic data includes the quantity of the target data flows.

The controller 500 according to this embodiment of the present application may correspond to the controller 300 in the foregoing embodiment of the present application, and may correspond to the controller that performs the method 100 in the foregoing embodiment of the present application. In addition, the foregoing and other operations and/or functions of the modules of the controller 500 are used for implementing procedures corresponding to the controller in the method in FIG. 2. For brevity, details are not described herein again.

Therefore, the network device management controller in this embodiment of the present application receives statistical traffic data sent by multiple network devices, and performs global processing according to a traffic status of each port or a traffic status of a transmitted data flow included in the statistical traffic data. The controller can adjust a path of a data flow dynamically by changing a routing table of a network device, thereby improving link utilization, and further improving network performance.

The foregoing processor may be a general purpose processor. It may implement or perform the methods, the steps, and logical block diagrams that are disclosed in the embodiments of the present application. The general purpose processor may be a microprocessor. Steps of the method disclosed in this embodiment of the present application may be performed by a decoding processor.

The memory in the embodiments of the present application may be a volatile memory or a nonvolatile memory, or may include a volatile memory, and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory DDR SDRAM), an enhanced synchronous dynamic random access memory (ESDRAM), a synchronous link dynamic random access memory (SLDRAM), and a rambus dynamic random access memory (RDRAM). The memory of the systems and methods described in this specification includes but is not limited to these and any memory of another proper type.

A person of ordinary skill in the art may be aware that, in combination with the examples described in the embodiments disclosed in this specification, units and steps may be implemented by hardware or a combination of software and hardware.

It may be clearly understood by a person skilled in the art that, for the purpose of convenient and brief description, for a detailed working process of the foregoing system, apparatus, and unit, reference may be made to a corresponding process in the foregoing method embodiments.

In the several embodiments provided in the present application, the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, a coupling connection, a direct coupling connection or a communication connection between units of the apparatus disclosed in the several embodiments of this application may be a coupling connection or a communication connection through several ports, apparatuses or units, or may be an electrical connection or a connection in another form.

The units described in this application may or may not be physically separate, and parts displayed as units may or may not be physical units, may be located in one position, or may be distributed on a plurality of positions. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. The technical solution of the present application or a part of the technical solution may be embodied in the form of a software product. The computer software product is stored in a storage medium and includes several instructions for instructing a computer device (which may be a personal computer, a server, or a network device) to perform a part of the steps of the methods described in the embodiments of the present application. The foregoing storage medium includes: any medium that can store program code, such as a removable hard disk, a ROM, a RAM, a magnetic disk, or an optical disc.

The foregoing descriptions are implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A network device management method, comprising:
receiving, from a controller, an individual instruction message to instruct a network device to return statistical traffic data, wherein the individual instruction message comprises statistical period information;
generating the statistical traffic data periodically according to the statistical period information contained in the individual instruction message, wherein the statistical traffic data comprises one or more of a quantity of data of a port of the network device, a queue status of the network device, a quantity of data packets that pass through the network device, and a quantity of target data flows that pass through the network device, wherein the queue status comprises a queue occupancy rate, and the target data flows are data flow to be measured; and
sending the statistical traffic data to the controller periodically according to the statistical period information contained in the individual instruction message.

2. The method according to claim 1, wherein the individual instruction message comprises an identifier of a target data flow, and the statistical traffic data comprises the quantity of the target data flows; and
wherein the generating the statistical traffic data according to the individual instruction message comprises:
determining the target data flow according to the identifier of the target data flow; and
collecting statistics of the quantity of the target data flows, so as to generate the statistical traffic data.

3. The method according to claim 1, wherein the individual instruction message comprises an identifier of a target data flow, and the statistical traffic data comprises the quantity of the target data flows; and
wherein the generating the statistical traffic data according to the individual instruction message comprises:
determining the target data flow according to the identifier of the target data flow; and
collecting statistics of the quantity of the target data flows, so as to generate the statistical traffic data.

4. An apparatus, comprising:
a transceiver; and
a processor coupled with the transceiver,
wherein the transceiver is configured to receive, from a controller, an individual instruction message to instruct the apparatus to return statistical traffic data, wherein the individual instruction message comprises statistical period information;
wherein the processor is configured to generate the statistical traffic data periodically according to the statistical period information contained in the individual instruction message, wherein the statistical traffic data comprises one or more of a quantity of data of a port of the apparatus, a queue status of the apparatus, a quantity of data packets that pass through the apparatus, and a quantity of target data flows that pass through the apparatus, wherein the queue status comprises a queue occupancy rate, and the target data flows are data flows to be measured, and
wherein the transceiver is configured to send the statistical traffic data to the controller periodically according to the statistical period information contained in the individual instruction message.

5. The apparatus according to claim 4, wherein the individual instruction message comprises an identifier of a target data flow, and the statistical traffic data comprises the quantity of the target data flows; and
wherein the processor is further configured to:
determine the target data flow according to the identifier of the target data flow; and
collect statistics of the quantity of the target data flows, so as to generate the statistical traffic data.

6. The apparatus according to claim 4, wherein the individual instruction message comprises an identifier of a target data flow, and the statistical traffic data comprises the quantity of the target data flows; and
wherein the processor is further configured to:
determine the target data flow according to the identifier of the target data flow; and
collect statistics of the quantity of the target data flows, so as to generate the statistical traffic data.

7. An apparatus, comprising:
a transceiver; and
a processor coupled with the transceiver,
wherein the transceiver is configured to:
send an individual instruction message to each of one or more network devices to instruct each of the one or more network devices to return statistical traffic data, wherein the individual instruction message comprises statistical period information for each of the one or more network devices;
receive the statistical traffic data that is sent periodically by each of the one or more network devices according to the statistical period information contained in the individual instruction message, wherein the statistical traffic data comprises one or more of a quantity of data of a port of each network device, a queue status of each network device, a quantity of data packets that pass through each network device, and a quantity of target data flows that pass through each network device, wherein the queue status comprises a queue occupancy rate, and the target data flows are data flows to be measured, and
wherein the processor is configured to manage the one or more network devices according to the statistical traffic data that is periodically received from the one or more network devices.

8. The apparatus according to claim 7, wherein the individual instruction message comprises an identifier of a target data flow, and the statistical traffic data comprises the quantity of the target data flows.

9. The apparatus according to claim 7, wherein the individual instruction message comprises an identifier of a target data flow, and the statistical traffic data comprises the quantity of the target data flows.

* * * * *